United States Patent [19]

Burnand et al.

[11] Patent Number: 4,802,895
[45] Date of Patent: Feb. 7, 1989

[54] COMPOSITE DIAMOND ABRASIVE COMPACT

[76] Inventors: Richard P. Burnand, 39 Constantia Ave., Alan Manor, Johannesburg, Transvaal; Kenneth A. Mackenzie, 215 Oak Ave., Ferndale, Randburg, Transvaal, both of South Africa

[21] Appl. No.: 70,369

[22] Filed: Jul. 7, 1987

[30] Foreign Application Priority Data

Jul. 14, 1986 [ZA] South Africa ................. 86/5237

[51] Int. Cl.⁴ ............................................. B24D 3/00
[52] U.S. Cl. ....................................... 51/293; 51/308; 51/309
[58] Field of Search ..................... 51/293, 308, 309

[56] References Cited

U.S. PATENT DOCUMENTS 3,745,623  7/1973  Wentrof, Jr. et al. ........... 76/101 A
4,311,490  1/1982  Bovenkerk et al. ................. 51/293
4,525,178  6/1985  Hall ..................................... 51/293
4,527,998  7/1985  Knemeyer ........................... 51/309
4,604,106  8/1986  Hall et al. ............................ 51/293
4,662,896  5/1987  Dennis ................................. 51/293
4,686,080  8/1987  Hara et al. ........................... 51/309

FOREIGN PATENT DOCUMENTS 1489130  10/1977  United Kingdom .

Primary Examiner—Paul Lieberman
Assistant Examiner—Willie J. Thompson
Attorney, Agent, or Firm—Scully, Scott, Murphy & Presser

[57] ABSTRACT

A composite diamond abrasive compact is produced from fine diamond particles in the conventional manner except that a thin layer of fine carbide particles is placed between the diamond particles and the cemented carbide support. The provision of the thin layer of carbide particles reduces the incidence of the formation of imperfect sinter areas in the compact.

5 Claims, 1 Drawing Sheet

COMPOSITE DIAMOND ABRASIVE COMPACT

BACKGROUND OF THE INVENTION

This invention relates to composite diamond abrasive compacts.

A composite diamond abrasive compact consists of a diamond compact bonded to a cemented carbide support. The diamond compact consists of a polycrystalline mass of diamond particles and optionally a second phase. When a second phase is provided the phase will generally contain or consist predominantly of a diamond catalyst such as cobalt. The diamond content of a diamond compact will generally be greater than 70% by volume of the compact.

Composite diamond abrasive compacts and their method of manufacture are well known in the art and are described in the patent literature. Examples of relevant patent specifications in this regard are U.S. Pat. No. 3,745,623 and British Patent No. 1,489,130. The disclosures of these two patent specifications are incorporated herein by reference.

Composite diamond abrasive compacts are used as inserts for various tools such as turning, grinding and cutting tools. The cemented carbide support will be brazed or otherwise bonded to the tool while the diamond compact will provide a cutting edge or point.

Composite diamond abrasive compacts are made under elevated temperature and pressure conditions at which diamond is crystallographically stable. In producing these compacts either fine or coarse diamond particles are used depending on the desired end use. Problems have been encountered in producing composite diamond abrasive compacts using fine diamond particles. It has been found difficult to avoid imperfect sinter areas developing within the diamond compact layer and the presence of such imperfect sinter areas is deleterious to the performance of the product.

SUMMARY OF THE INVENTION

According to the present invention there is provided a method of making a composite diamond abrasive compact including the steps of:

(a) providing a reaction capsule for a high temperature/high pressure apparatus;

(b) loading the reaction capsule by placing therein a cemented carbide body, a thin layer of fine carbide powder of particle size less than 2 microns on a surface of the carbide body, and a mass of fine diamond particles of average particle size less than 20 microns on the layer of carbide powder;

(c) placing the loaded reaction capsule in the reaction zone of the high temperature/high pressure apparatus;

(d) subjecting the contents of the reaction capsule to elevated conditions of temperature and pressure suitable to form a composite diamond abrasive compact; and (e) recovering the composite diamond abrasive compact from the reaction capsule.

DETAILED DESCRIPTION OF THE INVENTION

The fine carbide powder will generally have an average particle size ranging from 0.5 to 1 micron. These particles will be provided in the form of a thin layer on the cemented carbide surface, generally no more than 50 microns in depth. The carbide powder may be any known in the art, but will preferably be tungsten carbide powder.

As is stated above, the invention has application to the producion of composite diamond abrasive compacts using fine diamond particles, i.e. particles having an average particle size of 20 microns or less, usually 5 microns or less. During compact manufacture cobalt or like binder metal from the cemented carbide infiltrates the diamond mass and assists in the formation of the diamond compact. It has been found that the provision of the thin layer of fine carbide particles on the cemented carbide surface ensures uniform and complete infiltration of the binder metal into the diamond mass substantially reducing the incidence of imperfect sinter areas. The formation of such areas is inhibited further, it has been found, by mixing a small quantity, i.e. up to about 5% by mass, of powdered cobalt, nickel or iron, preferably cobalt, with the diamond particles.

Figure 1:
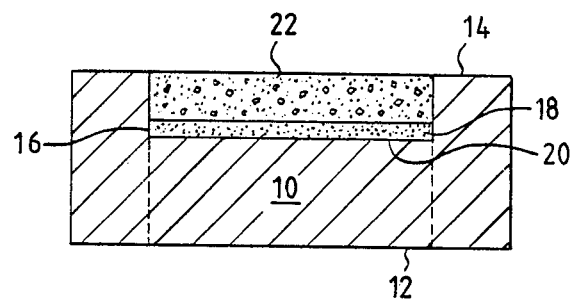
FIG. 1 illustrates a sectional side view of a cemented carbide body for use in the method of the invention.

The cemented carbide body may be disc-shaped as illustrated by FIG. 1. Referring to this Figure, a disc-shaped cemented carbide body 10 has major flat surfaces 12, 14 on each of opposite sides thereof. A recess 16, circular in plan, is formed in the flat surface 14. The layer 18 of carbide powder is placed in the lower surface 20 of the recess and the layer 22 of diamond particles placed on the carbide layer 18. After production of the composite abrasive compact the sides, illustrated by dotted lines of the cemented carbide body 10 are removed, e.g. by grinding, to expose a cutting edge of the compact.

Figure 2:
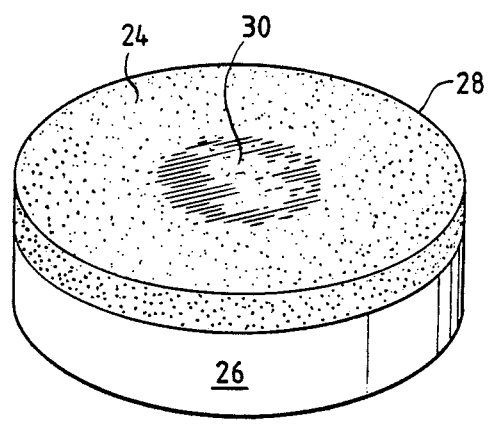
FIG. 2 illustrates a composite diamond abrasive compact produced by the method of the invention.

The composite abrasive compact with the exposed cutting edge is illustrated by FIG. 2. Referring to this figure, there is shown a composite diamond abrasive compact comprising a diamond compact layer 24 bonded to a cemented carbide backing or support 26. The diamond abrasive compact layer has a peripheral cutting edge 28.

The reaction capsule in which the cemented carbide body, carbide layer and diamond layer are placed is well known in the art as is the high temperature/high pressure apparatus. The apparatus is, for example, described and illustrated in U.S. Pat. No. 2,941,248 and U.S. Pat. No. 3,745,623, the disclosures of which are incorporated herein by reference.

The temperature and pressure conditions necessary to produce a diamond abrasive compact are also well known in the art. Typically, pressures of the order of 50 to 70 kilobars and temperatures of the order of 1400° to 1600° C. are applied to the contents of the reaction capsule. These conditions are maintained for a period of at least 5 minutes, and generally a period of 10 to 30 minutes.

The advantages obtained following the method of the invention will now be illustrated with reference to the following example. Two diamond abrasive compacts were produced. Each compact was produced using a disc-shaped cemented carbide body as illustrated by FIG. 1. For the first compact, produced using conventional methods and which will be designated "A", only diamond particles having an average particle size of 2 microns were placed in the recess 16. For the second compact, produced according to the method of the invention and which will be designated "B", a layer 40 microns in depth of fine carbide particles having an average particle size of 1 micron was placed on the surface 20 of the recess. A layer of fine diamond particles having an average particle size of 2 microns and mixed with 2% by mass of powdered cobalt was placed on top of the carbide layer. For both compacts, the loaded disc was placed in the reaction capsule of a conventional high temperature/high pressure apparatus and exposed to a pressure of 60 kilobars and a temperature of 1500° C. and these conditions were maintained for a period of 15 minutes. After compact manufacture, the sides of the carbide discs were removed by grinding as described and illustrated above to produce compacts of the type illustrated by FIG. 2.

For the compact "A" inhomogeneous areas of substantial size were visually evident at the compact centre (see FIG. 2, reference number 30). Diamond grain growth occured and there was a high incidence of metallic streaks indicating imperfect sinter areas. In contrast, the compact "B" exhibited minimal areas of inhomogeneity and metallic streaks and there was no diamond grain growth. In producing the two types of compacts on a pilot plant basis the incidence of commercially suitable compacts produced using the method of the invention was far higher than that of the prior art method.

The compacts "A" and "B" were subjected to a turning test. For this test, the compact was cut into fragments, the first having a cutting edge at the peripheral edge 28 (designated "edge" in the Table below), the second having a cutting edge 16mm from the peripheral cutting edge 28 (designated "middle" in the Table below) and the third having a cutting edge dead centre of the disc (designated "centre" in the Table below). Each fragment was used to turn a silicon flour filled epoxy resin workpiece and the flank wear on the cutting edge in mm$^2$ was measured after 5 minutes of turning. The lower the value of the wear flank the better the wear resistance and abrasive properties of the cutting edge. The results obtained are set out in the Table below:

TABLE

| | Flank wear (mm$^2$) | |
|---|---|---|
| Edge | Middle | Centre |
| COMPACT "A" | | |
| 0.119 | 0.177 | 0.384 |
| 0.152 | 0.145 | 0.226 |
| 0.116 | 0.164 | 0.446 |
| 0.100 | 0.129 | 0.501 |

TABLE-continued

| | Flank wear (mm$^2$) | |
|---|---|---|
| Edge | Middle | Centre |
| COMPACT "B" | | |
| 0.122 | 0.145 | 0.152 |
| 0.106 | 0.135 | 0.171 |
| 0.100 | 0.161 | 0.171 |
| 0.103 | 0.158 | 0.155 |
| 0.135 | 0.187 | 0.187 |

From the above Table, it is apparent that the cutting edge at the centre of compact "A" had poor abrasion resistance and hence cutting properties demonstrating inhomogeneity at the centre and an imperfect sinter area. No such area was found in the centre of compact "B". Consequently, it was possible to produce a larger number of commercially useful composite abrasive compacts from the compact "B" than it was possible to produce from the compact "A". As is known in the art, a disc-shaped composite abrasive compact is cut into a number of shapes such as triangle, rectangle, hexagonal and the like and it is the fragments of these shapes which are used in a variety of abrading operations.

We claim:
1. A metohd includes the steps of:
    (a) providing a reaction capsule for a high temperature/high pressure apparatus;
    (b) loading the reaction capsule by placing therein a cemented carbide body, a thin layer of "fine" carbide powder of average particle size less than 2 microns on a surface of the carbide body, and a mass of "fine" diamond particles of average particle size less than 20 microns on the layer of carbide powder;
    (c) placing the loaded reaction capsule in the reaction zone of the high temperature/high pressure apparatus;
    (d) subjecting the contents of the reaction capsule to elevated conditions of temperature and pressure suitable to form a composite diamond abrasive compact; and
    (e) recovering the composite diamond abrasive compact from the reaction capsule.
2. A method according to claim 1 wherein the diamond particles have an average particle size of less than 5 microns.
3. A method according to claim 1 wherein the fine carbide powder has an average particle size in the range 0.5 to 1 micron.
4. A method according to claim 1 wherein the fine diamond particles are mixed with up to 5% by mass of a powder selected from cobalt, nickel and iron.
5. A method according to claim 4 wherein the metal is cobalt.

* * * * *

UNITED STATES PATENT AND TRADEMARK OFFICE
CERTIFICATE OF CORRECTION

PATENT NO. : 4,802,895

DATED : February 7, 1989

INVENTOR(S) : Richard P. Burnand, et al.

It is certified that error appears in the above-identified patent and that said Letters Patent is hereby corrected as shown below:

Column 2, line 32: "in the lower" should read as --on the lower--

Column 4, line 25, Claim 1: "A metohd includes the steps of:" should read as --A method of making a composite diamond abrasive compact includes the steps of:--

Signed and Sealed this

Seventh Day of November, 1989

*Attest:*

JEFFREY M. SAMUELS

*Attesting Officer*     *Acting Commissioner of Patents and Trademarks*